Jan. 16, 1945.  J. M. WESTRATE  2,367,633
JACK
Filed Feb. 7, 1942  3 Sheets-Sheet 1

Inventor
John M. Westrate
By Rice and Rice
Attorneys

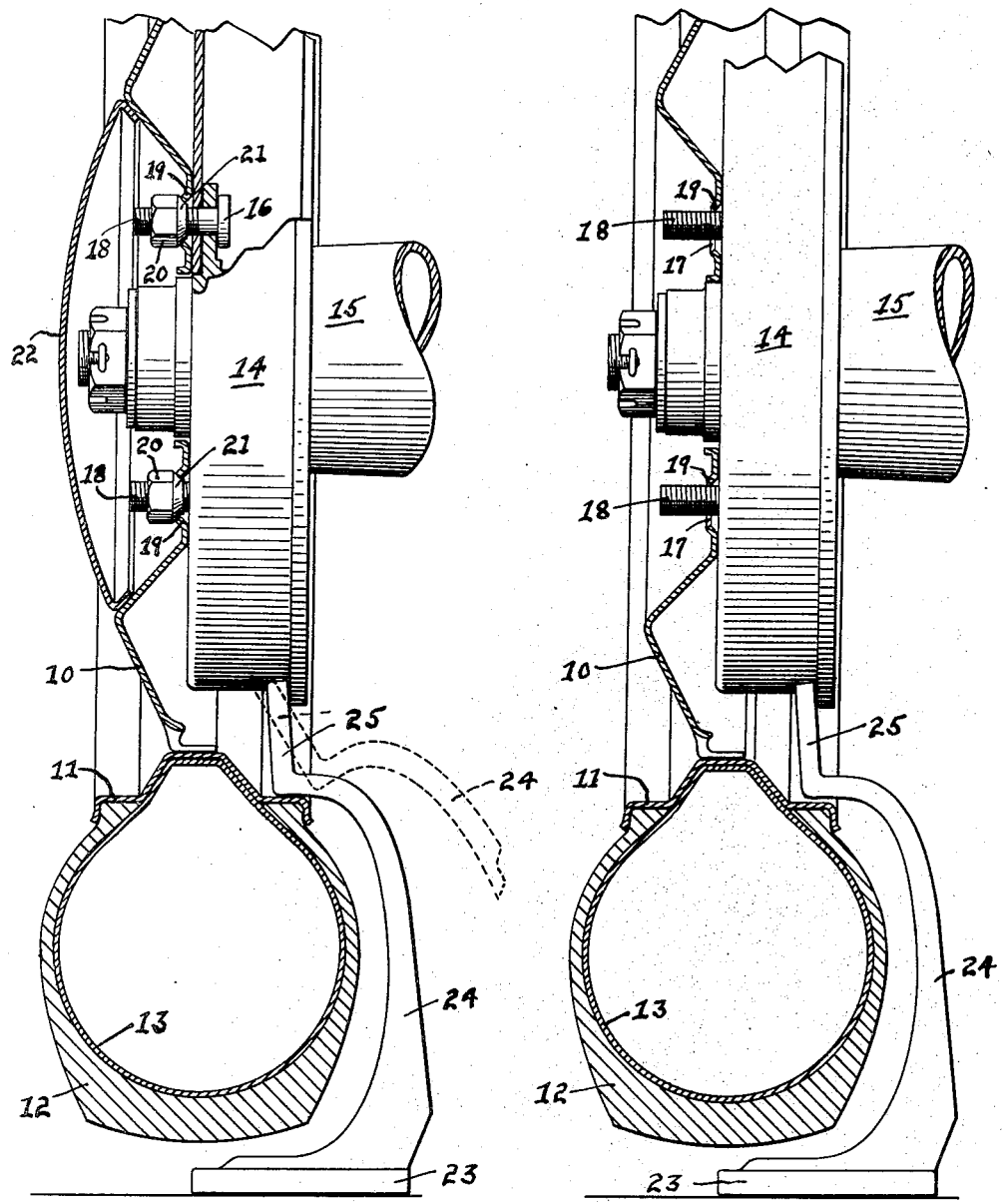

Jan. 16, 1945.   J. M. WESTRATE   2,367,633
JACK
Filed Feb. 7, 1942   3 Sheets-Sheet 3

Inventor
John M. Westrate
By Rice and Rice
Attorneys

Patented Jan. 16, 1945

2,367,633

UNITED STATES PATENT OFFICE 2,367,633

JACK

John M. Westrate, Grand Rapids, Mich.

Application February 7, 1942, Serial No. 429,882

1 Claim. (Cl. 254—94)

The present invention relates to a jack and more particularly to a motor vehicle jack of the general character illustrated and described in my co-pending applications for patents, Serial Nos. 333,277, filed May 4, 1940, now Patent No. 2,312,856, and 405,135, filed August 2, 1941, now abandoned, respectively.

The devices of the invention herein illustrated and described are in the nature of modifications of and/or improvements over the devices illustrated and described in my said co-pending applications and the primary objects of the instant invention are to provide a jack of the general character above indicated which in combination with the rim and spaced brake drum of the wheel of a motor car, is particularly well adapted for use in elevating and supporting a motor vehicle wheel above the ground, pavement or floor in instances wherein it is desired to change a tire, inspect the same or maintain one or more wheels of the vehicle in elevated position for any reason whatsoever; to provide such a device which may be readily and quickly detachably secured; to provide such a device which may be thus secured in a manner wherein radial slippage of the jack between the rim and brake drum of the wheel will not occur; to provide such a device which, in combination with the rim and brake drum of a wheel of a motor vehicle, may be used as a mud, snow, sand or ice hook in lieu of a tire chain and with considerably less effort in affixing it in place; and, to provide such a device which is most simple in construction, highly efficient and time-saving in use and which is very economical in manufacture.

Illustrative embodiments of the invention are shown in the accompanying drawings, wherein:

Figure 5 is an enlarged fragmentary cross sectional view of a conventional type motor vehicle wheel illustrating in dotted lines the manner in which the jack is detachably secured between the rim and brake drum of the wheel which jack is thereafter swung inwardly from its initial position shown in dotted lines to its position shown in full lines;

Figure 6 is a view similar to Figure 5 but showing how the rim is dropped after removal of the rim securing lugs, permitting ready withdrawal of the rim and its tire;

Figure 2:
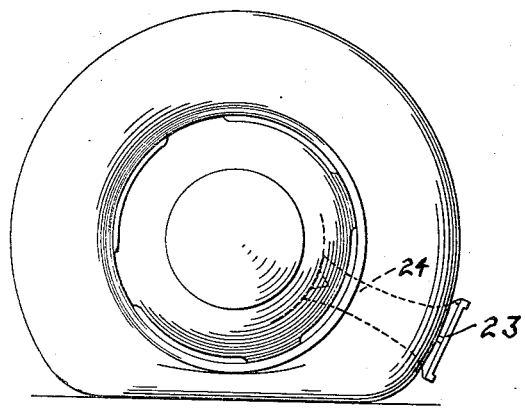
Figure 2 is a view illustrating the manner in which the jack is secured between the rim and brake drum of a motor vehicle wheel prior to its elevation.
Figure 3:
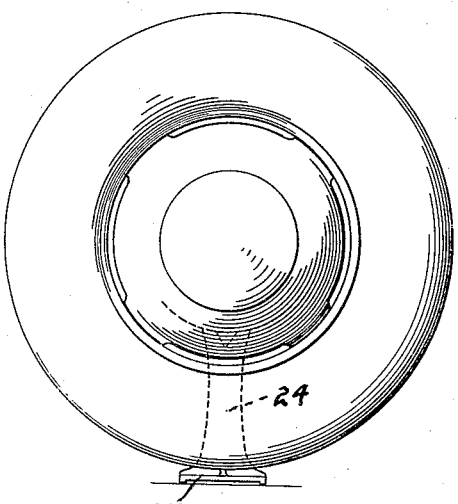
Figure 3 is a view illustrating a motor vehicle wheel in its elevated position after the wheel has been rotated from its position shown in Figure 2 to its position shown in Figure 3 through the movement of the motor car under its own power.
Figure 1:
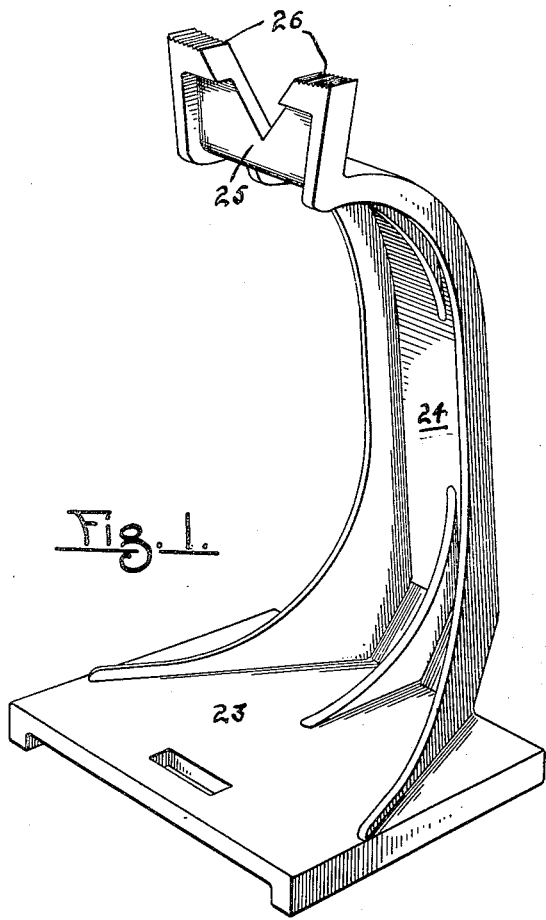
Figure 1 is a perspective view of one form of the jack.
Figure 4:
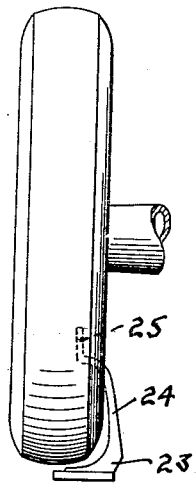
Figure 4 is an end elevational view of the motor vehicle wheel shown supported by the jack in elevated position after movement to that position under power of the vehicle.

Referring then to the drawings and firstly to Figures 1–6 thereof and wherein the several parts of the motor vehicle wheel and its elevating and supporting jack are each designated by the same numerals in the several views, a conventional type motor vehicle wheel 10 is provided with a rim 11 on which is mounted a tire casing 12 and its pneumatic inner tube 13.

A brake drum 14 in circumferentially spaced relation to the rim 11 is secured to the axle 15 of the vehicle and is provided with a plurality of laterally disposed and outwardly projecting bolts 16 equally radially spaced about the axle.

The wheel 10 is provided with a like plurality of bolt shank receiving apertures 17, each adapted to register with and receive a shank 18 of a bolt 16, all as best shown in Figures 5 and 6. Each shank receiving aperture 17 is provided with an outwardly turned circumferential lip 19 and each is of a diameter somewhat greater than the diameter of its received bolt shank 18.

Nuts 20, each having an inner conically formed surface 21, when in screw threaded engagement with the outwardly turned circumferential lip 19 of a shank receiving aperture 17, secure the wheel 10 to the brake drum 14 as shown in Figure 5 and upon removal of the hub cap 22, the nuts 20 may be unloosened from their shanks 18 whereupon the wheel 10 drops as shown in Figure 6, permitting its ready removal from the brake drum 14.

The jack per se shown in Figures 1–6 is preferably formed from cast or stamped metal and comprises a horizontally disposed foot portion or base member 23 of substantial width and breadth, an arcuate upstanding web portion 24, and a vertically disposed V-shaped head 25 forming a spaced serrated brake drum support 26.

The head 25 of the jack is adapted to be inserted at an angle between the brake drum 14 and rim 11 as indicated by dotted lines in Figure 5 from which position it is swung inwardly as shown in full lines in the same view and it is wedgingly retained between the brake drum 14 and slightly springable rim 11. Removal of the nuts 20 causes the rim to drop onto the bolt shanks 18 as shown in Figure 6, permitting ready and convenient removal of the rim and its tire, the brake drum being supported on the jack.

Figure 7:
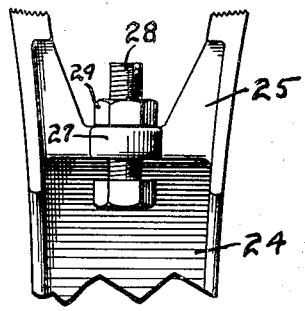
Figure 7 is a fragmentary rear elevational view of the device having a modified form of adjustable head.
Figure 8:
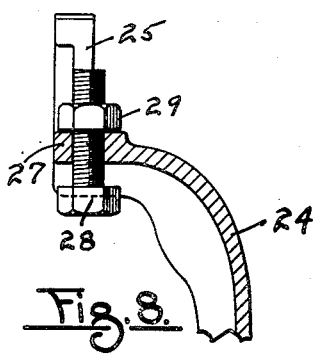
Figure 8 is a vertical central sectional view of the modified form of head shown in Figure 7.

In the modified form of jack shown in Figures 7 and 8, the upper end of its web portion 24 is provided with a horizontally disposed boss 27 having a screw threaded bore within which a vertically disposed bolt 28 is screw threadedly adjustable and may be fixed in adjusted position by the lock nut 29. Thus in use and after adjustment of the bolt 28, the bolt head engages the rim and the head 25 of the jack engages the brake drum after insertion therebetween in the manner heretofore described.

Figure 9:
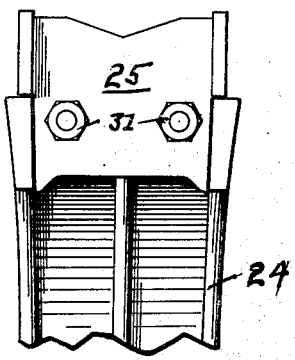
Figure 9 is a fragmentary rear elevational view of a device having another modified form of head.
Figure 10:
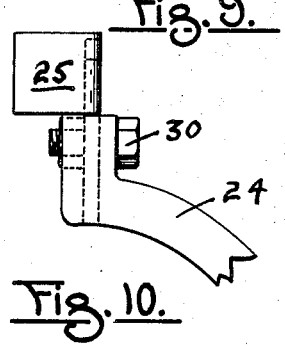
Figure 10 is a side elevational view of the modified form of head shown in Figure 9.

In the modified construction shown in Figures 9 and 10, the web portion 24 of the jack is provided with a pair of spaced apertures and interchangeable heads 25 of varying heights may be secured to the web portion by bolts 30 and their nuts 31.

Figure 11:
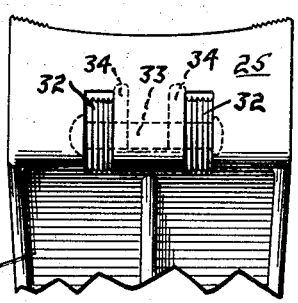
Figure 11 is another fragmentary rear elevational view of a device having yet another modified form of head.
Figure 12:
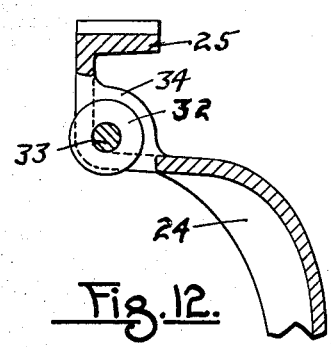
Figure 12 is a side elevational view, partly in vertical section, of the head shown in Figure 11.

In the modified form of jack shown in Figures 11 and 12, the head 25 is provided with a pair of spaced horizontally disposed rollers 32 connected by a shaft 33 rotatable in spaced bearings 34 which spaced rollers make for more convenient insertion of the head 25 between the brake drum 14 and rim 11 of the motor car wheel.

Figure 14:
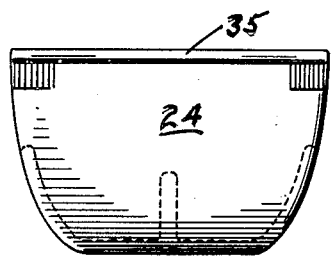
Figure 14 is a top plan view of the head of the jack shown in Figure 13.
Figure 13:
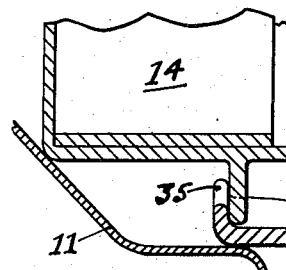
Figure 13 is a vertical central sectional view of a brake drum and rim together with a fragmentary view of a modified form of jack adapted for use in instances wherein there is little space between the rim and brake drum.
Figure 15:
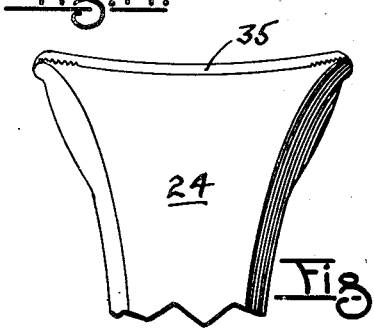
Figure 15 is a fragmentary front elevational view of the jack shown in Figure 13.

In the modified construction shown in Figures 13–15, the outer upper end of the web portion 24 is provided with an upwardly flanged lip 35 which form of jack is particularly adapted for use in instances wherein there is but a relatively small circumferential space between the brake drum 14 and rim 11.

It will thus be seen that the devices of the instant invention herein illustrated and described are simple in construction, highly efficient and time-saving in use and are economical in manufacture; and while but several specific embodiments of the invention have been herein shown and described, it will be understood that certain details of the constructions shown may be altered or omitted without departing from the spirit of the invention as the same is defined by the following claim.

I claim:

A motor vehicle jack adapted to elevate and support a motor vehicle wheel having a rim and a drum spaced therefrom and rotatable therewith, said jack comprising an elongated element having a head portion provided with an adjustable vertically disposed bolt whose head and the head portion of the elongated element are adapted to detachably clamp the rim and drum when inserted therebetween and then swung inwardly toward the wheel, said jack having a foot portion extending radially beyond the periphery of the wheel when said head portion and bolt head is thus inserted whereby rotation of the wheel in a movement of the vehicle effects an elevation and support of the wheel.

JOHN M. WESTRATE.